United States Patent
Sardina et al.

(10) Patent No.: US 10,025,710 B2
(45) Date of Patent: Jul. 17, 2018

(54) PATTERN FOR INTEGRATING PRIMARY AND SECONDARY DATA STORES IN A SHARDED DATA DOMAIN

(71) Applicant: Wal-Mart Stores, Inc., Bentonville, AR (US)

(72) Inventors: Jason Sardina, Carlsbad, CA (US); Alexei Olkhovskii, Carlsbad, CA (US); Robert P. Lowell, San Marcos, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 384 days.

(21) Appl. No.: 14/266,412

(22) Filed: Apr. 30, 2014

(65) Prior Publication Data
US 2015/0317340 A1    Nov. 5, 2015

(51) Int. Cl.
*G06F 12/0802* (2016.01)
*G06F 12/08* (2016.01)
*G06F 17/30* (2006.01)

(52) U.S. Cl.
CPC .......... *G06F 12/08* (2013.01); *G06F 12/0802* (2013.01); *G06F 17/30312* (2013.01); *G06F 17/30362* (2013.01); *G06F 17/30575* (2013.01); *G06F 17/30584* (2013.01); *G06F 2212/603* (2013.01)

(58) Field of Classification Search
CPC ................. G06F 12/08; G06F 12/0802; G06F 17/30312; G06F 17/30362; G06F 17/30575; G06F 17/30584; G06F 2212/603

USPC ... 707/803, 704, 999.008, 999.101, 999.102, 707/999.103, E17.007; 711/114, 133; 714/6.12, E11.13
See application file for complete search history.

(56) References Cited

U.S. PATENT DOCUMENTS 5,764,903 A     6/1998 Yu
5,960,194 A *   9/1999 Choy ...................... G06F 9/355
(Continued)

FOREIGN PATENT DOCUMENTS

WO     WO2013147785 A1     10/2013

OTHER PUBLICATIONS

MC Brown, Developing with Couchbase Server, Jan. 31, 2013, O'Reilly Media, First Edition, 1-87 Jan. 31, 2013.

*Primary Examiner* — Alex Gofman
*Assistant Examiner* — Kamal K Dewan
(74) *Attorney, Agent, or Firm* — Bryan Cave Leighton Paisner LLP

(57) ABSTRACT

Example systems and methods for integrating a sharded primary data store (e.g., a source-of-truth relational database management system), a secondary data store (e.g., external cache) and an external global index are described. The approach implements a modified read-through/write-through data access pattern that integrates read and write flows in order to support high-concurrency environments while maintaining immediate consistency between all three stores. Writes are handled using a three-phase flow that avoids concurrency-related race conditions and the need to block in the secondary store in order to maintain cross-store consistency. Reads are never dirty and will repair the secondary store as needed, presenting an immediately consistent view of data to application consumers.

15 Claims, 12 Drawing Sheets

(56) References Cited

U.S. PATENT DOCUMENTS

| | | | |
|---|---|---|---|
| 6,438,562 B1* | 8/2002 | Gupta | G06F 17/30336 707/696 |
| 8,037,024 B1 | 10/2011 | Bozkaya | |
| 8,316,131 B2 | 11/2012 | Sheets | |
| 8,438,364 B2 | 5/2013 | Venkataramani | |
| 8,572,031 B2 | 10/2013 | Merriman | |
| 8,626,709 B2 | 1/2014 | Isaacson | |
| 8,661,068 B1* | 2/2014 | Seibel | G06F 17/30132 707/825 |
| 2002/0194149 A1* | 12/2002 | Gerber | G06F 17/30595 |
| 2005/0021567 A1 | 1/2005 | Holenstein | |
| 2005/0154846 A1* | 7/2005 | Chen | G06F 11/2074 711/162 |
| 2005/0283522 A1 | 12/2005 | Parkkinen | |
| 2006/0047819 A1 | 3/2006 | Caddes | |
| 2007/0008068 A1 | 1/2007 | Brice et al. | |
| 2007/0043749 A1 | 2/2007 | Gerber | |
| 2008/0201174 A1 | 8/2008 | Ramasubramanian et al. | |
| 2009/0254556 A1 | 10/2009 | Guo et al. | |
| 2010/0185597 A1 | 7/2010 | Dunn | |
| 2011/0022627 A1 | 1/2011 | Mohan | |
| 2011/0179228 A1* | 7/2011 | Amit | G06F 3/0608 711/135 |
| 2012/0297237 A1 | 11/2012 | Chatterjee et al. | |
| 2012/0303911 A1 | 11/2012 | Perrin | |
| 2012/0310878 A1 | 12/2012 | Vuksan | |
| 2013/0110961 A1* | 5/2013 | Jadhav | G06F 15/167 709/213 |
| 2013/0290249 A1 | 10/2013 | Merriman | |
| 2013/0325986 A1 | 12/2013 | Brady | |
| 2014/0006458 A1 | 1/2014 | Hsieh | |
| 2014/0012814 A1 | 1/2014 | Bercovici | |
| 2014/0047181 A1* | 2/2014 | Peterson | G06F 12/0873 711/118 |
| 2014/0047190 A1* | 2/2014 | Dawkins | G06F 12/0813 711/136 |
| 2014/0108421 A1 | 4/2014 | Isaacson | |
| 2014/0164327 A1* | 6/2014 | Ngo | G06F 3/061 707/625 |
| 2014/0258255 A1* | 9/2014 | Merriman | G06F 17/30362 707/704 |
| 2014/0279855 A1* | 9/2014 | Tan | G06F 17/30345 707/609 |
| 2014/0279881 A1* | 9/2014 | Tan | G06F 17/30345 707/613 |
| 2014/0280276 A1* | 9/2014 | Prasanna | G06F 17/30584 707/758 |
| 2014/0310391 A1 | 10/2014 | Sorenson, III | |
| 2015/0088642 A1 | 3/2015 | Mathew | |
| 2015/0278282 A1 | 10/2015 | Sardina et al. | |
| 2016/0034358 A1* | 2/2016 | Hayasaka | G06F 3/0619 711/113 |

* cited by examiner

US 10,025,710 B2

PATTERN FOR INTEGRATING PRIMARY AND SECONDARY DATA STORES IN A SHARDED DATA DOMAIN

TECHNICAL FIELD

The present disclosure relates to methods and systems for integration a primary and secondary data store within a sharded data domain.

BACKGROUND

Some service-oriented architecture (SOA) designs impose high concurrency/low latency requirements on primary data store for read and write operations. Read-intensive activity can be scaled by offloading queries from the primary (source-of-truth) data store to a secondary (caching) store. Write=intensive activity, on the other hand, must always modify the primary/source-of-truth. Accordingly, the primary data store must be sharded to meet write scale requirements. This patent proposal describes a pattern for implementing a horizontally scalable sharded primary data store. The pattern provides immediate consistency guarantees to the primary and secondary data stores, as well as an additional "external global index". The external global index enforces uniqueness constraints within a sharded domain and enables applications to use a business defined key(s) to navigate to the correct shard within a primary's data domain.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
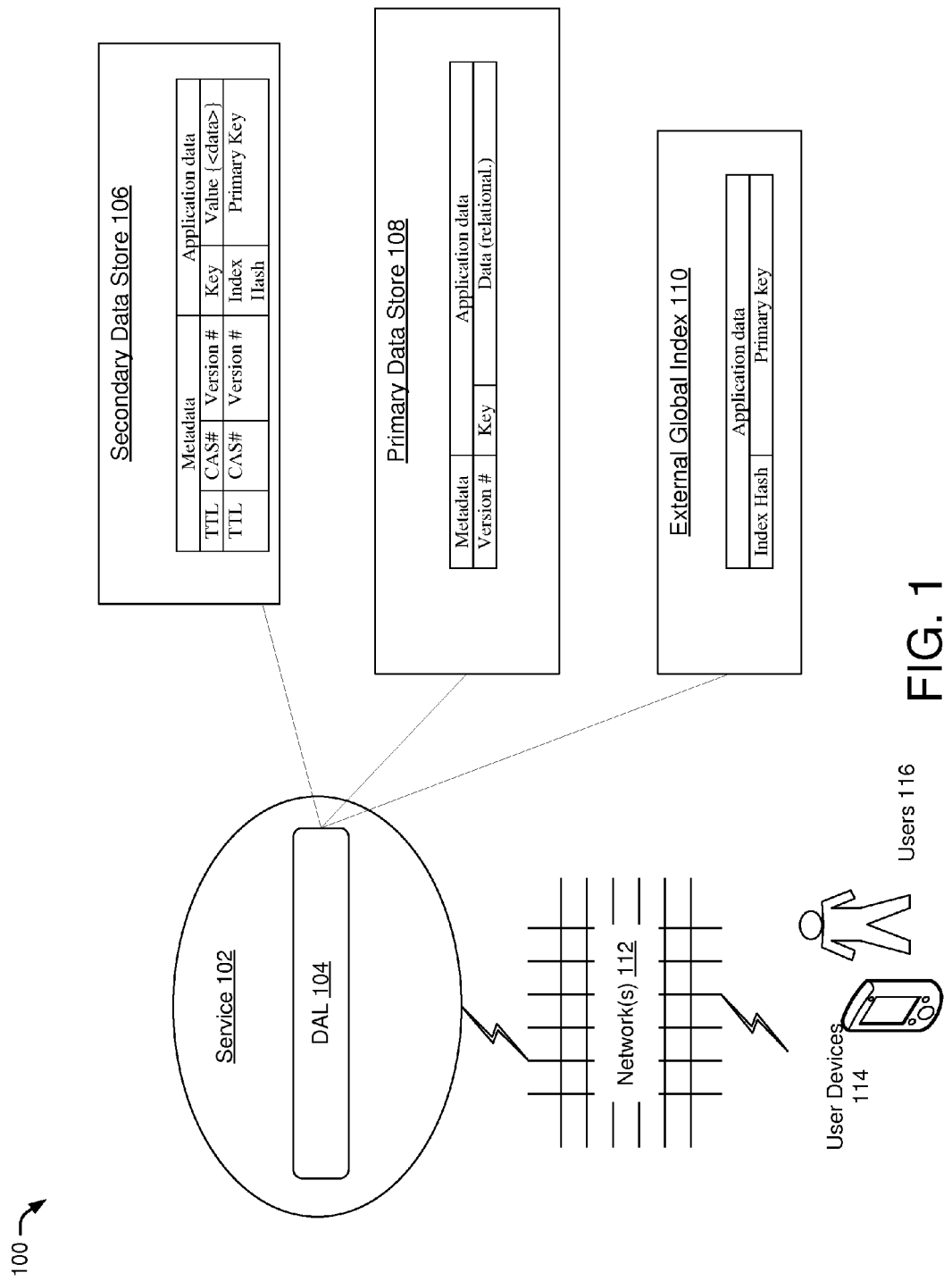
FIG. 1 is a block diagram depicting a computing environment within which an example embodiment of the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Scaling online transaction processing (OLTP) systems to handle heavy read load are often achieved by offloading queries from a primary data store to a horizontally scalable secondary caching store. However, alternative measures are required when the primary data store reaches its write capacity. One solution to scale write capacity is to shard a data store to split a data store horizontally into multiple smaller stores. Because each store generally lives on separate hardware, scaling horizontally enables applications to meet concurrency and throughput requirements that cannot be met by a single monolithic data store.

Embodiments of the present disclosure relate to patterns for implementing immediately consistent writes across a sharded primary data store, an external global index, and a secondary data store. For example, the sharded primary data store may include the source-of-truth data store. The external global index may include a logically separate data store that supports uniqueness of natural/alternative keys across a sharded domain and the ability to map a natural key to the shard that owns the source-of-truth data. The secondary data store may acts as a cache to offload read activity from the sharded primary store and the external global index.

FIG. 1 is a block diagram depicting a computing environment 100 within which an example embodiment of the present disclosure may be implemented. Computing environment 100 includes a service 102, which may include a set of related hardware and/or software of which functionalities may be reused for different purposes, together with the policies that controls its usage. Service 102 may include a data access logic (DAL) 104 and one or more servers that are associated with DAL 104 (e.g., operating). DAL 104 may enable application services to persist data while abstracting the details of the persistence process. DAL 104 may be a layer of an application and/or application services, which provides simplified access to data stored in persistent storage (e.g., relational databases). In some embodiments, DAL 104 may be a code library that implements the primary flows for the pattern presented in this paper. For example, DAL 104 may be consumed by an application to coordinate operations (e.g., create, read, update, delete).

In some embodiments, DAL 104 may be a code library that implements the primary flows for the pattern presented in this paper. DAL 104 may be consumed by an application to coordinate operations (e.g., create, read, update, delete). As defined herein, a put may refer to a general category of write operations that includes both inserts (create) and updates. A get may refer to key-based read operations. There may be difference between get-by-PK (primary key) and get-by-AK (alternative key or natural key) calls. A Get-by-AK call may access the external global index in order to retrieve an associated primary key. A Get-by-PK call may implement logic to map a primary key (shard key) to the correct shard and then returns the requested aggregate. A delete may refer to data removal operations. It is noted that put, get, or delete calls act as an abstraction between a related application and the persistence layer. A DAL call may be internally responsible for cross-store coordination and data modifications.

In some embodiments, DAL 104 may manage persistence associated with a secondary data store 106, a primary data store 108, and an external global index 110. In some embodiments, secondary data store 106 may be a key/value data store that may be kept immediately consistent with primary data store 108 under normal conditions. For example, secondary data store 106 may be an external cache that is physically separate from primary data store 108. A common secondary data store may include highly scalable NoSQL key/value stores or key-based text search stores (e.g., Apache Couchbase).

Secondary data store 106 may offload read activity from primary data store 112. Secondary data store 106 may support the following functionalities, for example, atomic write of a single serialized object (e.g., a JSON document), efficient key-based access, time-to-live (TTL) data expiration functionality, optimistic locking, update and Insert-only (add) methods, etc. Secondary data store 106 may store metadata, which include a TTL, a check and set (CAS) number, and a version number.

The TTL refers to a metadata attribute provided by certain data stores that sets an expiration time for a given record or set of records. Upon expiration, the record(s) may be removed from the data store automatically.

Optimistic locking enables a data store to prevent writes of stale data by associating a unique version number to the data in question. Specifically, data updates succeed when the updating process's version number matches that of the currently persisted data, and the newly persisted data has been modified to reflect a new version number. Common optimistic locking methods may include application-managed optimistic locking and CAS (check and set) optimistic locking.

With respect to application-managed optimistic locking, the application may retain the current state of an object's version number (i.e., "active version") during a transaction, generating a new version number (e.g., per transaction), and updating the data store when the persisted version number matches the active version number.

With respect to CAS optimistic locking, CAS functionality may be provided by the data store such that an application is able to retrieve data with a CAS version (i.e., "CAS get") and update data based upon the CAS version (i.e., "CAS put"). CAS may differ from application-managed optimistic locking in that CAS version numbers are often unknown to the application after CAS put.

External global index 110 may be a key/value data store in which the key is a unique ID representing an alternative key and the value is the corresponding primary key of an aggregate stored in the primary data store. The unique ID for a given alternative key may be generated as a hash of a concatenated string made of the aggregate's top-level table name, and an ordered list of each column in the alternative key and its associated value. This ID (e.g., an AK_HASH) may be thought of as Hash (table_name+col(0)+val(0)+ . . . +col(n)+val(n)). External global index 110 supports atomic writes of key/value pairs and efficient key-based access. External global index 110 may also be referred to as an "alternative key global index" (or AKGI database).

Because the external global index 110 has tight transactional integration with the primary data store, it is not required to support TTL or optimistic locking functionality; these attributes are derived from the primary data store.

External global index 110 provides two key functions in a sharded data domain. Firstly, external global index 110 provides fast access to an aggregate's primary key value by alternative key. Secondly, external global index 110 guarantees aggregate-level unique constraint consistency for alternative/natural keys within the sharded data domain. For example, a sharded customer data store may have a business rule that specifies email_address as a unique alternative key for each customer. External global index 110 may store a single alternative-key-to-primary-key map for the entire data domain, thus preventing two customer aggregates in different shards from using the same email_address value.

Because external global index 110 must scale to meet the write requirements of the primary data store, it is possible that external global index 110 may require sharding. If required, external global index 110 may be sharded using the AK_HASH as a shard key. In this manner, alternative/unique keys for a given value will always map to the same shard and the sharding data stores native unique constraints will be enforced.

DAL 104 may be connected to one or more network(s) 116 to exchange information with multiple user devices 114 associated with multiple users 116. Network(s) 112 may include wired and/or wireless networks that enable communications between the various computing devices described in environment 100. In some embodiments, network(s) 112 may include local area networks (LANs), wide area networks (WAN), mobile telephone networks (MTNs), and other types of networks, possibly used in conjunction with one another, to facilitate communication between the various computing devices (e.g., user devices 114, DAL 104, etc.). User devices 114 may be a mobile or desktop computer, a personal data assistant (PDA), an internet appliance, an internet enabled mobile phone, a server or any other computing device configured with a network connection.

DAL 104 supports two distinct get flows when reading from a sharded data domain: get-by-PK and get-by-AK.

When a primary key is known, the DAL 104 has sufficient information to execute a shard-aware aggregate get.

If the Service 102 queries by primary key, the aggregate is first looked for in the Secondary Data Store 106. If successful, the aggregate is returned to the application.

The Primary Data Store 108 is accessed when (1) there is a read miss from the Secondary Data Store 106 or (2) a read hit returns a null payload. A null payload indicates that an object is in the process of being inserted or potentially deleted. Primary Data Store 108 access by primary key is shard-aware.

If data was returned from the Primary Data Store 108, and if the Secondary Data Store 106 did not contain a null payload, the Secondary Data Store 106 is repaired through an insert only operation. The insert will fail if a record has already been added to the Secondary Data Store 106 by another session (i.e., via a concurrent put or get operation).

When a Service 102 requests an aggregate by alternative key (get-by-AK), the DAL 104 may perform two operations. Firstly, DAL 104 may map the alternative key provided to the aggregates primary key. Secondly, DAL 104 may look up the aggregate in the appropriate shard within the Primary Data Store 108 by primary key (get-by-PK call).

During a get-by-AK call, the Secondary Data Store 106 is always accessed first by AK_HASH and an aggregate's primary key is returned. Once a primary key has been identified for an aggregate, the DAL 104 issues a get-by-PK call to fetch the aggregate.

During get-by-AK calls, the External Global Index 110 is accessed when there is a read miss from the Secondary Data Store 106 or a read hit returns a null payload. If data was returned from the External Global Index 110, and if the Secondary Data Store 106 did not contain a null payload, the Secondary Data Store 106 may be repaired through an insert only operation. The insert will fail if a record has already been added to the Secondary Data Store 106 by another session (i.e., via a concurrent put or get operation). In rare situations the AK_HASH is not found, the DAL 104 may issue a broadcast query by alternative key across all shards in the Primary Data Store 108 to retrieve the aggregate's primary key.

As part of the get-by-AK flow, DAL 104 provides repair and reconciliation of the Secondary Data Store 106 and the External Global Index 110.

DAL 104 coordinates repair operations for both the Secondary Data Store 106 and the External Global Index 110. The Secondary Data Store 106 is repaired with a copy of an External Global Index 110 map after a prior miss. External Global Index 110 is repaired when a missing AK_HASH-to-PK mapping data is returned from the sharded Primary Data Store 108.

DAL 104 provides real-time reconciliation for External Global Index 110 data to ensure it is consistent with the Primary Data Store 108 by checking for "Orphaned AKs" and "Disowned AKs".

An AK is said to be an orphan when the AK_HASH-to-PK mapping that exists in the External Global Index 110 has no corresponding aggregate in the Primary Data Store 108. If a get request is made for an orphaned AK, the orphaned record is removed from the External Global Index 110 and the Secondary Data Store 106.

An AK is said to be disowned when the AK_HASH portion of the AK_HASH-to-PK mapping that exists in the Secondary Data Store 106 or the External Global Index 110 does not match the corresponding hash computed from the aggregate stored in the Primary Data Store 108. DAL 104 may delete invalid AK-HASH-to-PK mappings from the Secondary Data Store 106 or the External Global Index 110 if the two values do not match. Subsequently, DAL 104 may insert the correct AK_HASH-to-PK mapping in the appropriate store(s).

In some embodiments, DAL 104 may implement optimistic locking to ensure immediate consistency while avoiding race conditions that would result in primary data store 108, external global index 110, and secondary data store 106 being not synchronized. In some embodiments, optimistic lock management within the database persistence flow may prevent concurrent client updates from persisting stale records to either primary data store 108 or external global index 110. Breakable optimistic locks on secondary data store 106 may allow high concurrency in which a current record in secondary data store 106 is "owned" and updated by the latest transaction.

In some embodiments, DAL 104 may have a non-blocking design to ensure that application readers do not block application writers and that the application writers do not block the application readers within both primary data store 108 and secondary data store 106. In some embodiments, if secondary data store 106 includes a record, the mapping between the data of record and AK of the record may be retrieved from an appropriate database (e.g., external global index 110). Secondary data store 106 may then be updated with current data to support future reads. Embodiments of the present disclosure also implement reconciliation flows to automatically resolve exception-based inconsistencies between primary data store 108, external global index 110, and secondary data store 106. Accordingly, database transactions may be allowed to continue while secondary data store 106 is unavailable. Then, DAL 104 may perform automatic cleanup of secondary data store 106 to heal an abnormal termination of the persistence workflow after initial secondary data store setup. DAL 104 may also perform automatic cleanup of orphaned AKGI records to heal an abnormal termination during a commit phrase of AKGI 114 or primary data store 108.

Figure 2:
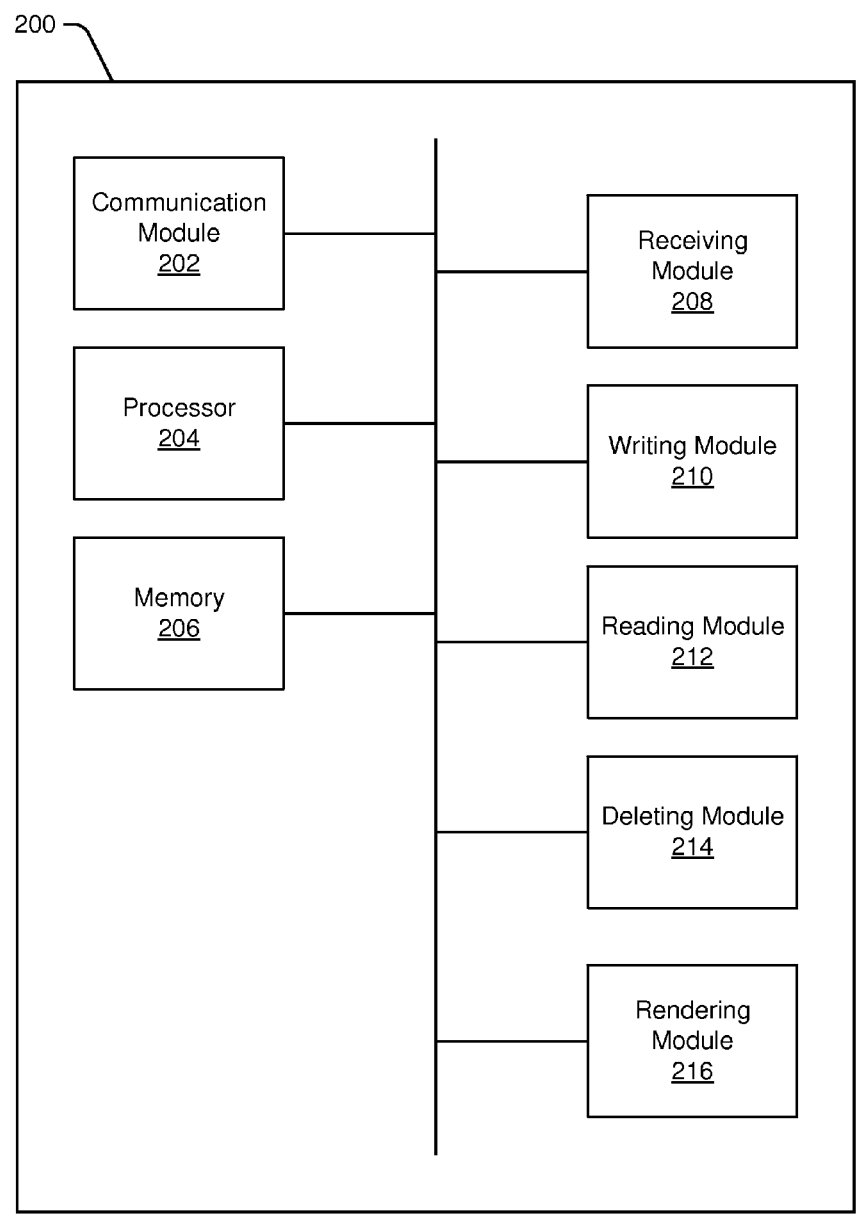
FIG. 2 is a block diagram depicting an embodiment of a computing device configured to implement systems and methods of the present disclosure.

FIG. 2 is a block diagram depicting an embodiment of a computing device 200 configured to implement systems and methods of the present disclosure. Computing device 200 (e.g., servers associated with DAL 104) performs various functions related to integration for distributed transactions in sharded data domain, as discussed herein. In some embodiments, computing devices 200 may include ones of computing devices that cooperatively implement the functions described herein. Computing device 200 may include a communication module 202, a processor 204, and a memory 206. Communication module 202 allows computing device 200 to communicate with other systems, such as communication networks, other servers, etc. Processor 204 executes one or more sets of instructions to implement the functionality provided by computing device 200. Memory 206 stores these instructions as well as other data used by processor 204 and other modules contained in computing device 200.

Computing device 200 may also include a receiving module 208 configured to receive a request for certain operations of a record across secondary data store 106, primary data store 108, and external global index 110. Database operations may include various operations on the database (e.g., read: retrieval, write: insert or update, delete). For example, a database write operation may include writing an item from a database (e.g., primary data store 108) into a program variable. A database read operation may include reading the values of a program variable into an item in the database or its metadata into the database. A cache read operation may include reading an item from, for example, a secondary data store (e.g., secondary data store 106) into a program variable. A cache write operation may include writing the values of a program variable into an item in, for example, secondary data store 106 cache or its metadata into secondary data store 106.

The request may be expressed in the Structured Query Language (SQL). The SQL may include different versions, and a variety of extensions. For example, SQL data definition language ("DDL") instructions are issued to a database server to create or configure database objects, such as tables, views, or complex data types. For example, SQL/XML is an extension of SQL to manipulate XML data in an object-relational database. In some embodiments, an object may include a particular instance of a class where the object may be a combination of variables, functions, data structures changing, etc., during transactions. A database transaction may include a logical unit of database processing that includes one or more access operations. A transaction may be specified in high level language (e.g., SQL) submitted interactively, or may be embodied within a program.

Computing device 200 may also include a writing module 210 configured to implement write operations across a database (e.g., primary data store 108), a secondary data store (e.g., secondary data store 106), and an external global index (e.g., external global index 110). For example, during read operations, writing module 210 may write data across primary data store 108, secondary data store 106, and external global index 110. In some embodiments, write module 210 may determine whether secondary data store 106 includes the record. In response to a determination that secondary data store 106 includes the record, write module 210 may initialize secondary data store 106 by updating metadata of the record in secondary data store 106. In these instances, the metadata may include a primary key (PK) associated with the record and an AK hash value associated with the record. Write module 210 may also perform, based on the PK and the AK hash value, a write operation of the record in the external global index 110 and primary data store 108, respectively, and update content data of the record in secondary data store 106 in response to determining that the write operation is successfully completed. In some embodiments, write module 210 may perform the write operation of the record in primary data store 108 after the write operation of the record is performed in external global index 110.

In some embodiments, write module 210 may set an optimistic locking value associated with the record, and perform the write operation of the record in external global index 110 and primary data store 108 in response to determining that the optimistic locking value has not been changed.

In response to a determination that the secondary data store 106 does not include the record, write module 210 may write the content data of the record in the secondary data store 106. In some embodiments, write module 210 may perform a delete operation of the record in external global index 110 in response to a determination that the write operation of the record in external global index 110 is not successfully completed.

In some embodiments, write module 210 may modify the AK associated with the record in response to determining that the write operation of the record in external global index 110 is not successfully completed.

In some embodiments, write module 210 may determine that the initializing the secondary data store 106 is not successfully completed, and log the record in a cache failure log table that includes the PK associated with the record, and a timestamp associated with the record.

Computing device 200 may also include a reading module 212 configured to implement read operations across primary data store 108, secondary data store 106, and external global index 110. For example, during read operations, reading module 210 may read data across primary data store 108, secondary data store 106, and external global index 110. In some embodiments, reading module 212 may determine whether the secondary data store 106 includes the record. In response to a determination that the secondary data store 106 includes the record, reading module 212 may generate an AK hash value associated with the record, and search the secondary data store 106 to identify a PK associated with the record using the AK hash value. Then, reading module 212 may retrieve the record using the PK value.

In response to a determination that the secondary data store 106 does not include the record, reading module 212 may determine whether the external global index 110 includes the record. In response to a determination that the external global index 110 includes the record, reading module 212 may returning the PK value, perform a read-repair operation of the record in the secondary data store 106, and return the record using the PK value.

In response to a determination that the external global index 110 does not include the record, reading module 212 may determine whether primary data store 108 includes the record by broadcasting the request to a plurality of shards of primary data store 108. In response to a determination that primary data store 108 includes the record, reading module 212 may perform an additional read-repair operation of the record in the secondary data store 106 and external global index 110, respectively, and return the record using the PK value.

Computing device 200 may also include a deleting module 214 configured to implement delete operations across primary data store 108, secondary data store 106, and external global index 110. For example, during read operations, writing module 210 may delete data across primary data store 108, secondary data store 106, and external global index 110. Computing device 200 may further include a rendering module 216 configured to provide a result and/or a report in response to the request received by DAL 104.

Figure 3:
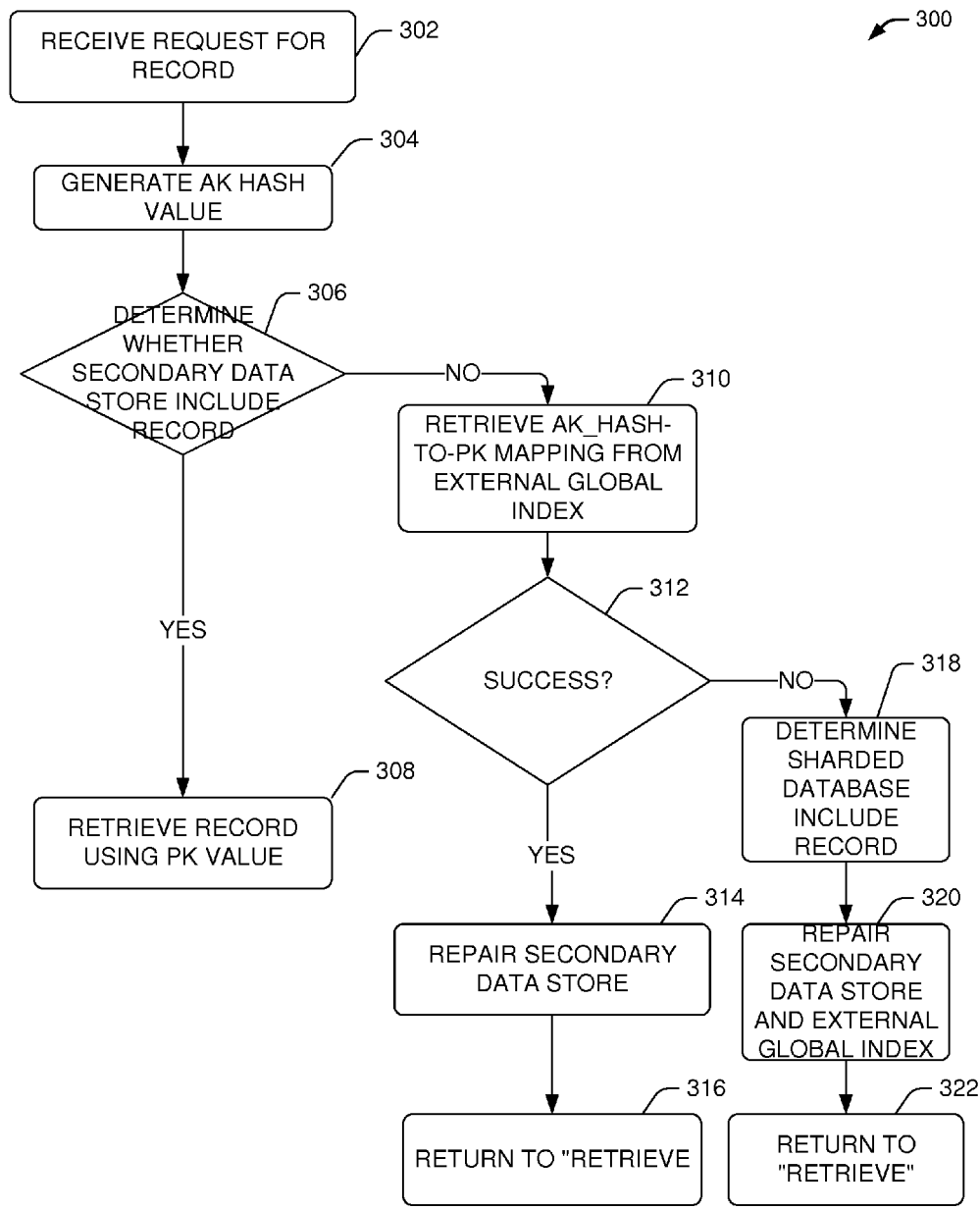
FIG. 3 is a flowchart diagram of an embodiment of a process for performing get operations across a primary data store, a secondary data store, and an external global index.

FIG. 3 is a flowchart diagram of an embodiment of a process 300 for performing get operations across primary data store 108, secondary data store 106, and an external global index 110. Example process 300 includes one or more operations, actions, or functions. Although illustrated as discrete blocks, various blocks may be divided into additional blocks, combined into fewer blocks, or eliminated, depending on the desired implementation. Process 300 may be implemented by one or more processors including, for example, the computing device 200. For illustrative purposes, the operations described below are performed by one or more processors of one or more server(s) of DAL 104 as shown in FIG. 1 and/or the processor 204 of the computing device 200 as shown in FIG. 2.

At 302, one or more processors of one or more servers of service 102 may receive a request for get operations of a record across secondary data store 106, primary data store 108, and external global index 110.

At 304, the one or more processors of one or more servers of service 102 may generate AK hash value associated with the record in response to a determination that secondary data store 106 includes the record.

At 306, the one or more processors of one or more servers of service 102 may determine whether secondary data store 106 includes the record. At 308, the one or more processors of one or more servers of service 102 may retrieve the record using the PK value in response to a determination that secondary data store 106 includes the record.

At 310, the one or more processors of one or more servers of service 102 may Retrieve AK_HASH-to-PK Mapping from external global index 110 in response to a determination that secondary data store 106 does not include the record.

At 312, the one or more processors of one or more servers of service 102 may determine whether the retrieval is successful.

At 314, the one or more processors of one or more servers of service 102 may repair secondary data store 106 in response to a determination that the retrieval is successful.

At 316, the one or more processors of one or more servers of service 102 may return to "Retrieve".

At 318, the one or more processors of one or more servers of service 102 may determine that primary data store 108 includes the record if the retrieval is not successful.

At 320, the one or more processors of one or more servers of service 102 may repair secondary data store 106 and external global index 110.

At 322, the one or more processors of one or more servers of service 102 may return to "Retrieve".

Figure 4A:
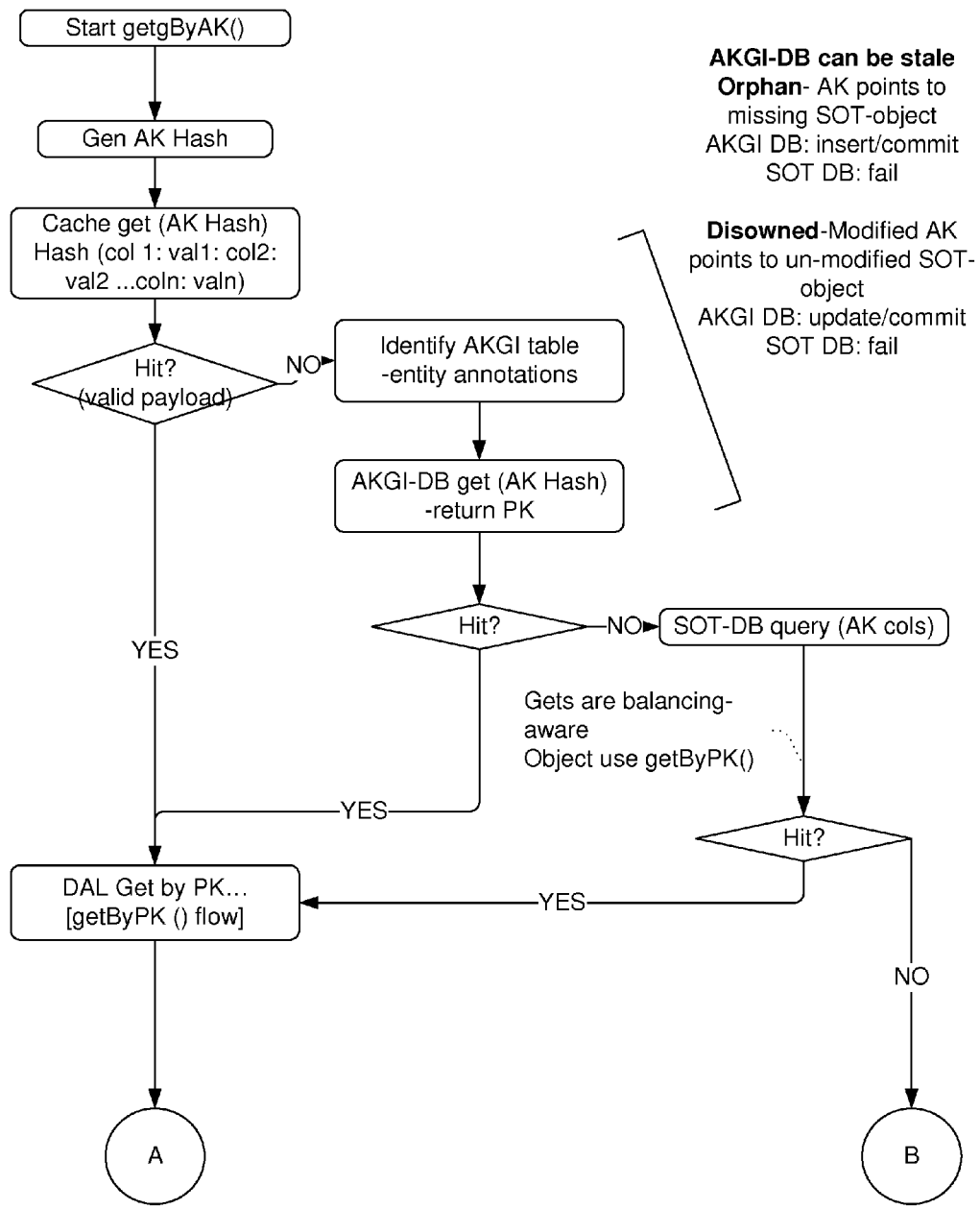
FIGS. 4A and 4B represent a flowchart diagram of an implementation of the embodiment of FIG. 3.
Figure 4B:
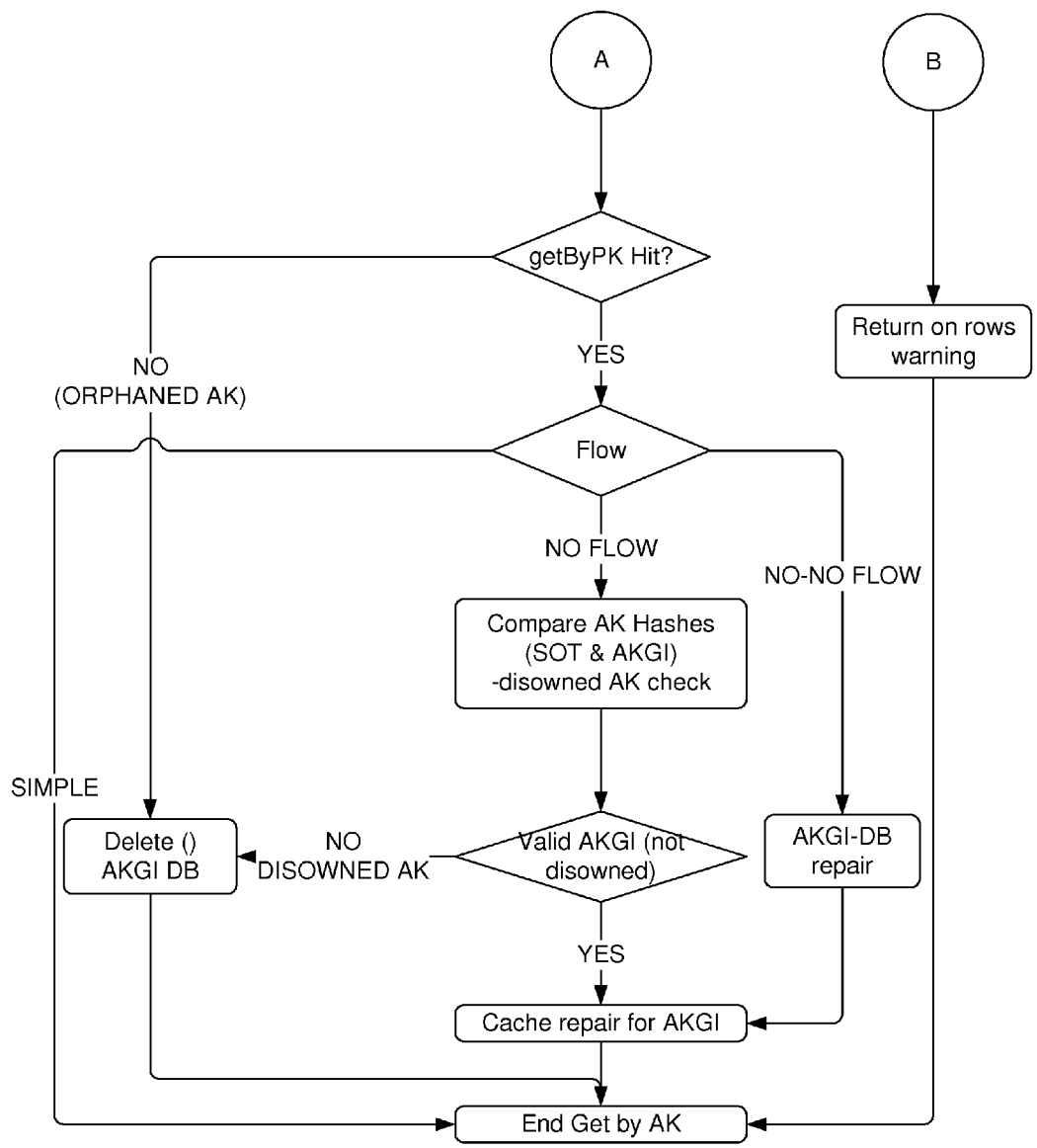

FIGS. 4A and 4B represent a flowchart diagram of an implementation of the embodiment of FIG. 3. As illustrated in FIGS. 4A and 4B, the getByAK follows a standard lookup pattern. DAL 104 may search secondary data store 106 first, external global index 110 second, and lastly broadcasting to primary data store 108. The AK_Hash is a unique numeric ID associated to an AK record. The AK_Hash is computed by hashing a concatenated string consisting of the column_name:column_value for each column in an AK.

If secondary data store 106 includes the record, an AK_Hash is generated. Then, secondary data store 106 may be searched by using AK_Hash, and a PK value may be returned. The PK value may be used to retrieve a domain object using the getByPK( ) call.

If secondary data store 106 missed by AK_Hash or a record is returned from cache with an empty (invalid) payload, external global index 110 is searched by AK_Hash, and a PK is returned. Invalid payload occurs when secondary data store 106 has been initialized with metadata but no object data is available (payload is null). For example, an INSERT is in progress (cache is initialized but not finalized) and an in-progress UPDATE had to initialize a new cache entry (cache miss) and has not finalized cache. After the PK is returned, a read-repair operation updates the secondary data store 106 with the appropriate AK_Hash-to-PK map. The PK value is then used retrieve a domain object using the getByPK( ) call.

If secondary data store 106 and external global index 110 both miss by AK_Hash, a query is broadcast to all sharded databases and a PK is returned. Broadcast miss returns "no data found" error and terminates the flow. Otherwise, read-repair is executed for both external global index 110 and secondary data store 106, and the PK value is used to retrieve a domain object using the getByPK( ) call.

Figure 5:
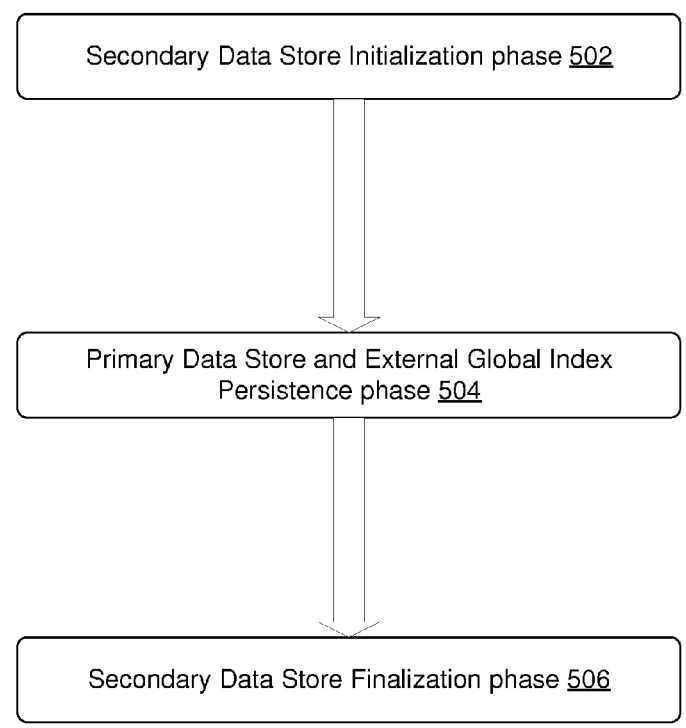
FIG. 5 is a flowchart diagram of an embodiment of a scheme for put operations across a primary data store, a secondary data store, and an external global index.
Figure 6A:
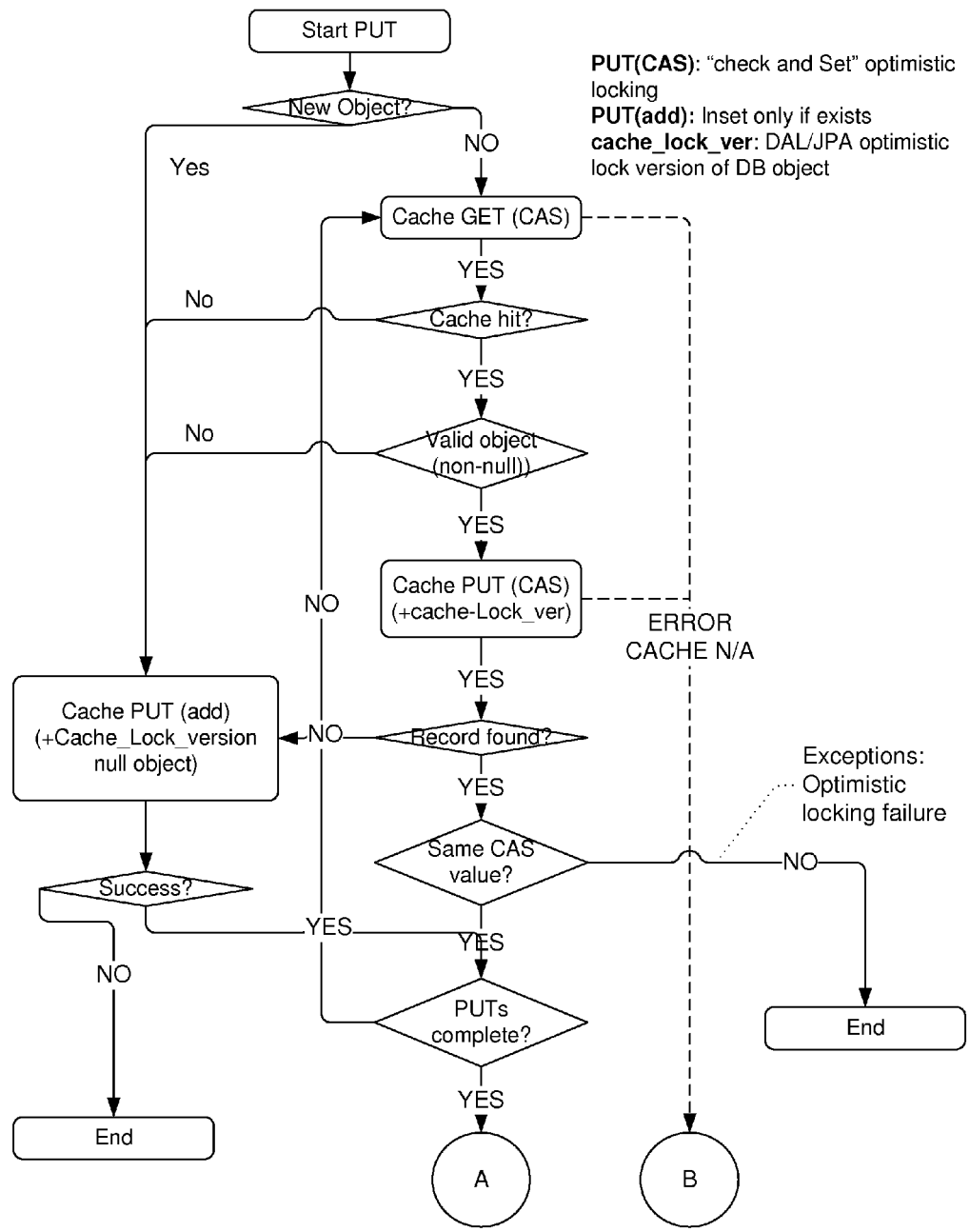
FIGS. 6A-6D represent a flowchart diagram of an implementation of an embodiment of a process for performing put operations across a primary data store, a secondary data store, and an external global index.
Figure 6B:
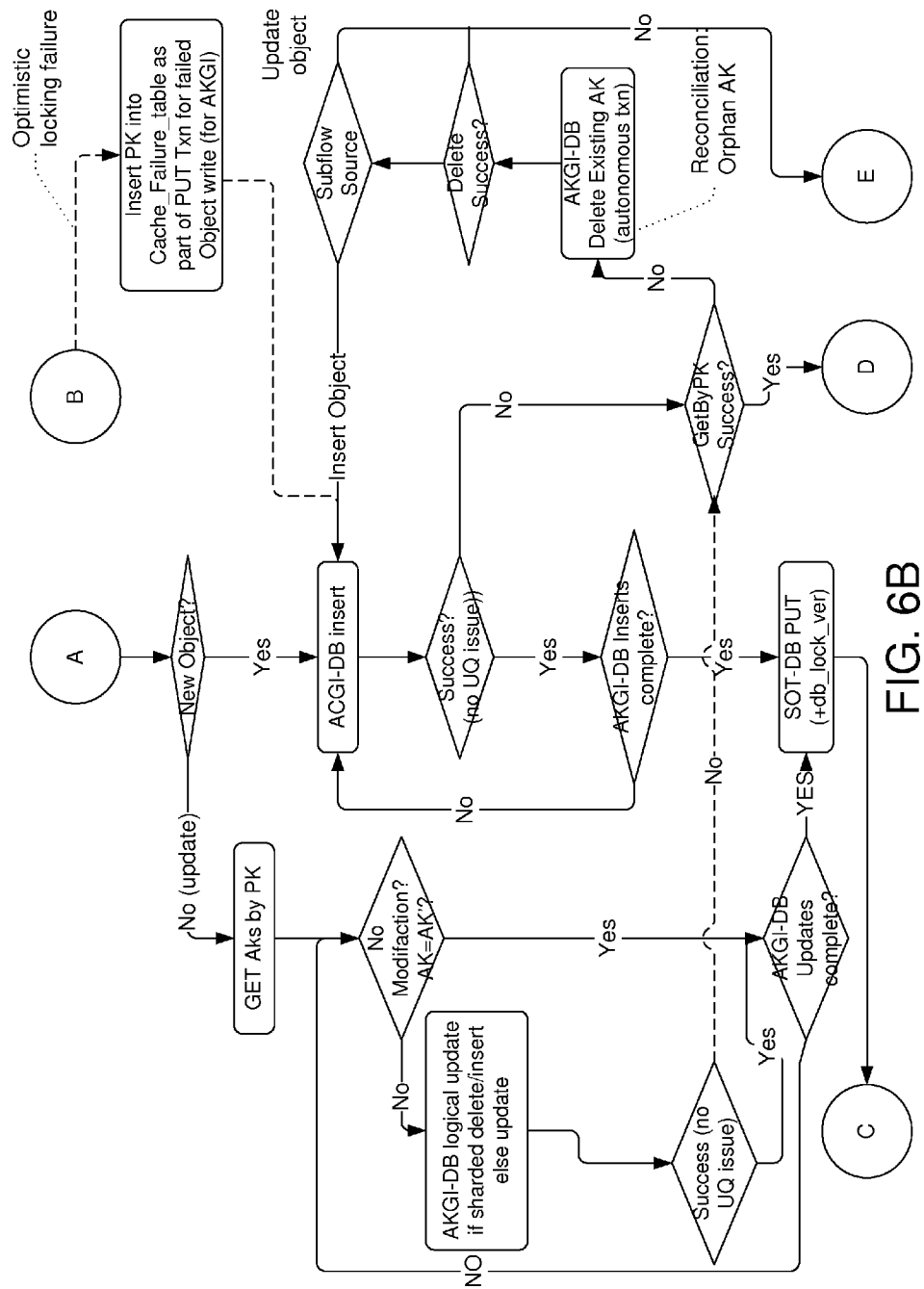
Figure 6C:
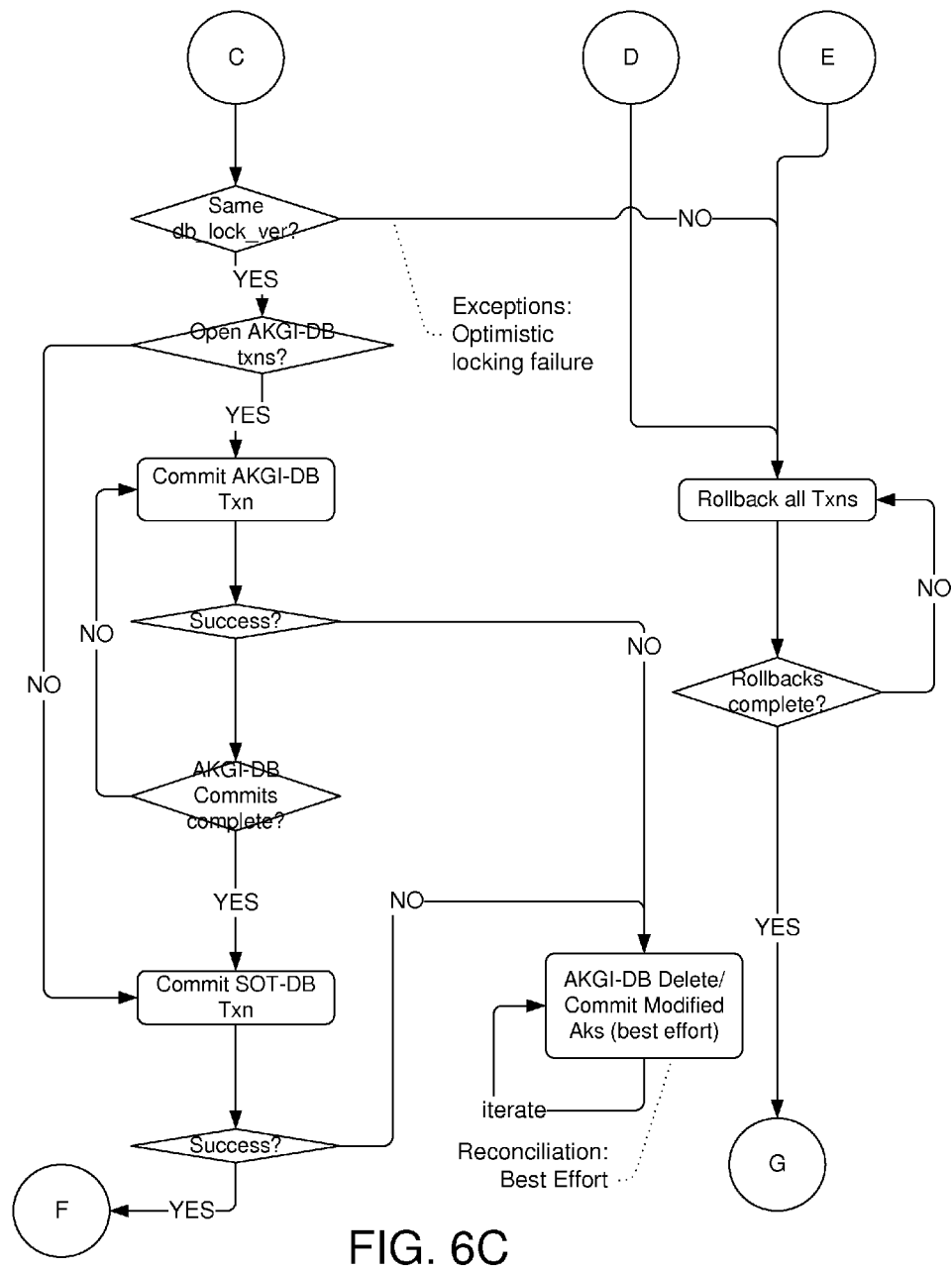
Figure 6D:
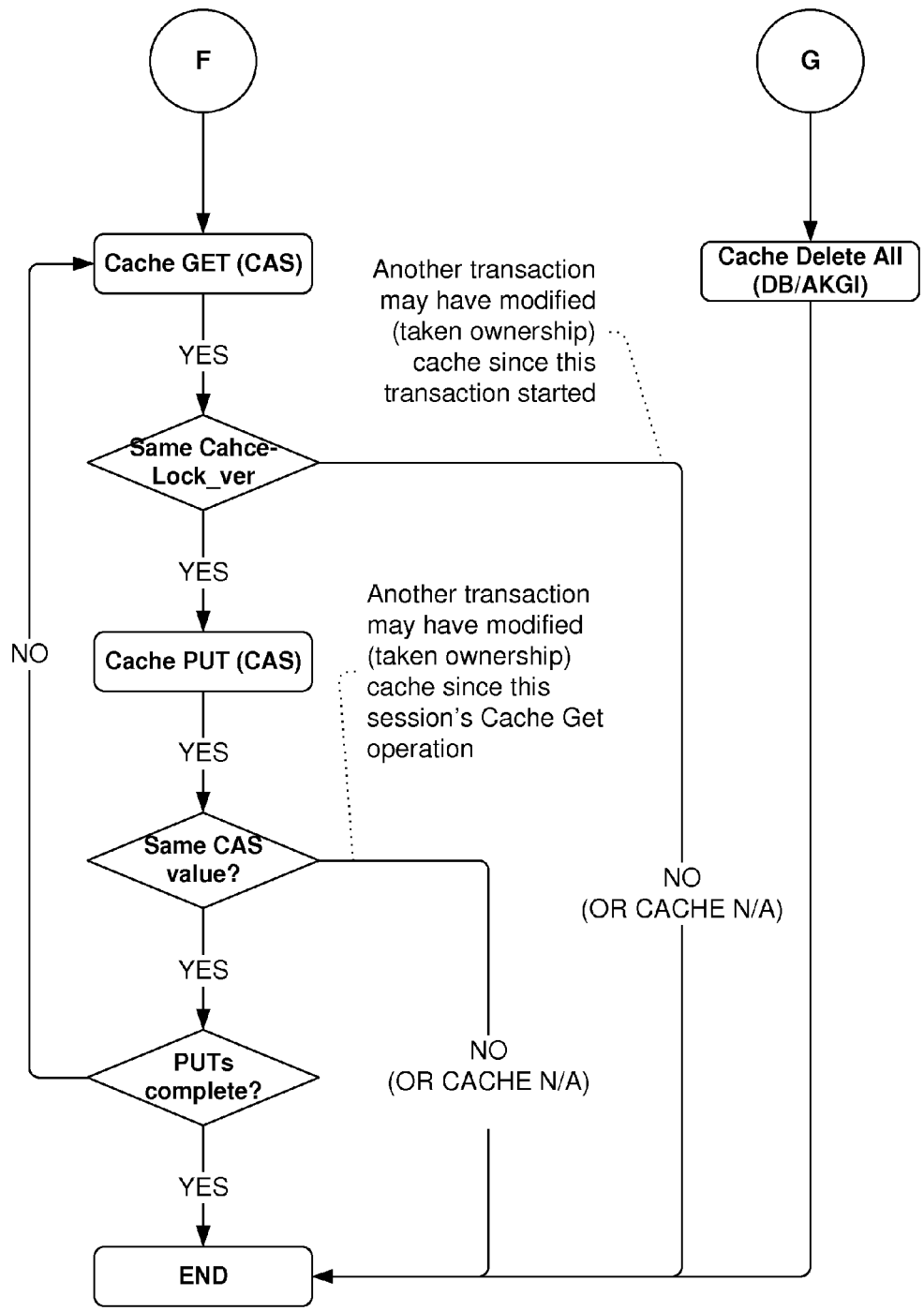

FIG. 5 is a flowchart diagram of an embodiment of a scheme for put operations across a primary data store, a secondary data store, and an external global index.

To keep all data stores immediately consistent, a put( ) operation coordinates a three-step flow: secondary data store initialization phase 502 (pinning), primary data store and external global index persistence phase 504, and secondary data store finalization phase 506.

The secondary data store 106 may maintain both a copy of aggregate data from the primary data store and a copy of the AK_HASH-to-PK mappings for these aggregates that have been stored in external global index 110.

Secondary data store initialization phase 502 relates to setting metadata for the aggregate and AK_HASH-to-PK map copies in the secondary data store 106. This process is called "pinning". During the pinning process, DAL 104 may change metadata associated with records in secondary data store 106 but may not change the record contents. Secondary data store contents are not modified until data is committed to the primary data store and external global index, thus avoiding the possibility of dirty reads from the secondary data store.

If DAL 104 is inserting a new aggregate, a null data payload may be stored along with the metadata. If a concurrent application read returns a null data payload, the request will be redirected to the appropriate data store (primary data store 108 or external global index 110) to service the call.

The order in which aggregate or AK_HASH-to-PK map records are modified within the secondary data store may not be absolute (because secondary data store 106 writes are non-blocking, deadlocks are not possible). In some embodiments, aggregate and AK HASH-to-PK mappings may be modified in a consistent order to "fail fast" due optimistic locking conflict. To be consistent with the persistence phase, AK_HASH-to-PK mappings may be updated followed by aggregate data.

There may be several ways a pin can be removed. For example, the pin may be removed when application's transaction completes (the pin is removed during the finalization phase). When a pin-specific TTL expires, the data may be removed from the secondary data store. When a subsequent session initiates an update on the same record in the secondary store, the prior pin may be broken and ownership of the record (a new pin is set) may be taken.

In the event that secondary data store 106 is not available (e.g., network, data store outage), secondary data store initialization phase 502 may be bypassed. For example, if the operation is an insert, no additional steps must be taken. The next read operation may repair secondary data store 106 to make it consistent with primary data store 108. If the operation is an update or delete, the key for the aggregate being modified may be written to a "Cache Failure Log" as part of the subsequent persistence phase transaction (see below). An asynchronous reconciliation job may use the failure log keys to remove stale records from secondary data store 106 when it becomes available. It is noted that the Cache Failure Log only requires the aggregate's primary key to be written; there is no requirement to log data related to the external global index.

The metadata written during the pinning phase may include a transaction-specific TTL. The TTL provides a guarantee that a failed process may not leave data in secondary data store 106 permanently stale. During secondary data store initialization phase 502, an application-specified TTL is set for the record that is to be changed (e.g., 20 seconds). If the put( ) flow terminates before reaching the finalization phase, the data will be expired from secondary data store 106 and reloaded with the next data access. Failure to finalize could result from a hardware or network failure, for example.

The metadata may also include an application-managed optimistic lock version. A record-level "cache lock version" may be written during secondary data store initialization phase 502 to support optimistic locking on secondary data store 106. During the finalization phase, a put( ) transaction may not finalize the related record(s) in the secondary store if the cache lock version has changed. A change to the cache lock version indicates that a subsequent session has taken ownership of the data in secondary data store 106. Because the first session no longer holds the pin on the data, it turns over data management to the latter process (the current pin holder). This "breakable pin" design enables high write concurrency within secondary data store 106 because sessions are never blocked waiting to initialize data.

The metadata may include a data-store-managed CAS value as well. If the secondary data store 106 supports conditional updates, the cache lock version is sufficient to support the initialization phase's optimistic locking requirements. However, if secondary data store 106 does not support conditional updates, the data store's CAS functionality will suffice. In this case, a record to be modified may be read with its CAS value from secondary data store 106, the metadata for the record including the TTL and cache Lock Version may be modified, and the updated record may be written back to the secondary data store via a CAS-aware put.

The primary data store and external global index persistence phase (persistence phase) 504 relates to writing aggregate data to the primary data store 108 and AK_HASH-to-PK mapping data to the external global index 110 as a single coordinated transaction. The persistence phase 504 may have strong transaction management and ordering requirements. All modifications to the external global index 110 must complete prior to changing the primary data store 108. Modifying the external global index first guarantees that each aggregate's unique constraints are enforced before the aggregate is written to the primary data store. Modifications to the external global index may be ordered to avoid the possibility of deadlocks occurring when two session attempt to change the same aggregate. Subsequently, commits to the external global index must complete prior to the primary data store commit.

Writing data to both external global index 110 and primary data store 108 before committing avoids race conditions that may be present if each data store had be updated and committed serially. Committing to the external global index first guarantees that get-by-AK calls may be able to access an aggregate at the primary data store if it exists. The risk of committing to the external global index first is that the subsequent commit to the primary data store may still fail, leaving an "orphaned AK" map in the index. This risk is mitigated through real-time reconciliation within the get-by-AK flow.

In some embodiments, writes to the primary data store 108 may be dependent upon optimistic locking validation. For example, the primary data store 114 may include a single "database lock version" that may be associated with the data being modified. In a relational model, the database lock version exists as a column in the top-level table for the object that is being persisted. As discussed with earlier optimistic locking mechanisms, when persisting data to the primary data store, the write may be successful if the database lock version being written matches the database lock version of the currently persisted object. As part of a successful object write, the database lock version may be modified to a new value (e.g., incremented or set to a unique value).

The external global index 110 may not implement optimistic locking, but may defer optimistic locking to the primary data store. In this manner, if the optimistic lock check succeeds at the primary, then the update of the external global index is considered valid. If the optimistic lock check fails at the primary, any modifications to the external global index are rolled back.

Unlike INSERT operations which update both the primary data store and the external global index, UPDATE operations may not change unique/alternative keys. To optimize for this scenario, DAL 104 may determine whether an INSERT or UPDATE was issued. If an UPDATE is being executed, DAL 104 may query primary data store 108 to determine the persisted state of the aggregate's unique/alternative keys. If the persisted state for these keys matches that of the to-be-persisted aggregate, then the unique/alternative keys have not been modified. Under these conditions, external global index 110 may not be updated, thus avoiding a distributed transaction with the primary data store.

If the put operation is updating one or more of the unique/alternative keys associated with an aggregate, DAL 104 first deletes the record(s) in question from the external global index and then inserts the modified record(s). This logical update is a precaution that enables external global index 110 to be sharded in the future, using the AK_HASH value as the shard key.

Coordination a distributed transaction across the primary data store and the external global index increases the number of exception conditions that may occur. The following scenarios may be managed by DAL 104 to help maintain immediate consistency between the primary, secondary and external global index data stores 110 and 112. The scenarios may include unique constraint violation. If a transaction fails on a unique constraint violation when attempting to update the external global index 110, updates to the external global index 110 may be rolled back and a best effort attempt is made to delete the associated record(s) from the secondary data store 106. Because no updates have yet been made to the primary data store 108, no additional actions may be required.

The scenarios may include pre-commit exceptions. In the event that a transaction fails for any reason during the persistence phase 504 before committing to either the primary data store or the external global index, then the transaction may be rolled back in both stores, (a best-effort attempt may be made to delete the associated records from the secondary data store 106, and an appropriate error message is returned to the application. Because neither transaction to the primary data store 108 nor the secondary index store 110 had yet committed, even a complete application failure would ultimately lead to system-managed rollback of these transactions.

The scenarios may include mid-commit exceptions (orphaned AKs). In the event that an INSERT operation commits one or more records to the external global index 110 and then fails before committing the aggregate to the primary data store 108, we are left with one or more "Orphaned AK" mappings in the index. Orphans are external global index mappings that return a primary key that does not exist in the primary data store 108. Under these conditions, the application makes a best effort attempt to remove the AK_HASH-to-PK mappings from the external global index and returns an appropriate error. If cleanup fails, DAL 104 leaves the orphans to be cleaned up by subsequent put or get operations.

The scenarios may include mid-commit exceptions (disowned AKs). In the event that an UPDATE operation commits changes to one or more mappings in the external global index 110 and then fails before committing the aggregate to the primary data store 108, one or more "Disowned AK" mappings may be left in the index. Disowned AKs are external global index mappings that return a valid primary key but have an AK_HASH that is inconsistent with the unique/alternative keys in the primary data store 108. Under these conditions, the application returns an appropriate error and leaves the disowned AK_HASH-to-PK mappings to be cleaned up by subsequent get operations.

Causes for transaction failure may include catchable write errors (e.g., unique key violation, check constraint violations) and optimistic locking failures. In the event that the related application fails during the persistence phase (e.g., hardware issue) and the best-effort attempt to repair the secondary data store 106 fails, records in the secondary data store 106 may not reach the finalization phase and may expire within an application-specified TTL time. TTL-based cleanup occurs whether or not there was a successful commit to the primary data store 108.

Both the put and get flows are responsible for cleaning up orphaned AK mappings when they are encountered. In the put flow, orphans are identified when INSERT or UPDATE operations fail due to a unique constraint violation. Before returning an error, DAL 104 is responsible for the following: retrieving the primary key for the offending AK_HASH from the external global index 110, and validating the existence of the aggregate associated with this primary key in the primary data store 108. If the aggregate does indeed exist within the primary data store 108, then the unique constraint violation may be valid. If the aggregate does not exist in the primary data store 108, then the mapping in the external global index is identified as an orphan and deleted. Once the orphan is removed, the put operation will continue.

Secondary data store finalization phase 506 relates to resetting relevant metadata and persisting aggregate and external global index data to secondary data store 106. The purpose of secondary data store finalization phase 506 is to update secondary data store 106 with application data (i.e., aggregate data and associated AK_HASH-to-PK mappings) and to reset the TTL metadata set during the initialization phase. Writing the application data brings secondary data store 106 to a consistent state with regard to primary data store 108. Resetting the TTL to a steady-state value (e.g., 1 day) ensures that secondary data store 106 may be able to service future read requests.

Finalizing the secondary data store may be dependent upon optimistic lock validation. For example, before the data can be finalized, the application may read the current state of the data from secondary data store 106, including the record's current CAS value. The application may compare the active cache lock version generated during the initialization phase to the version retrieved from the data store. If the active cache lock version matches the persisted version, the current session still owns the pin on secondary data store 106 and attempts a CAS-aware put of the modified record. In the event of an optimistic lock validation failure or a subsequent CAS put failure, the current session has lost its pin and will exit gracefully (no error, another session now owns the data in the secondary data store 106). Otherwise, secondary data store 106 may be updated to be consistent with the primary.

In the event of any abnormal application termination during the finalization flow, the TTL set during initialization will cause the stale record to expire from secondary data store 106 so that it can be repaired when next accessed.

FIGS. 6A-6D represent a flowchart diagram of an implementation 600 of an embodiment of a process for performing put operations across a primary data store, a secondary data store, and an external global index.

Figure 7A:
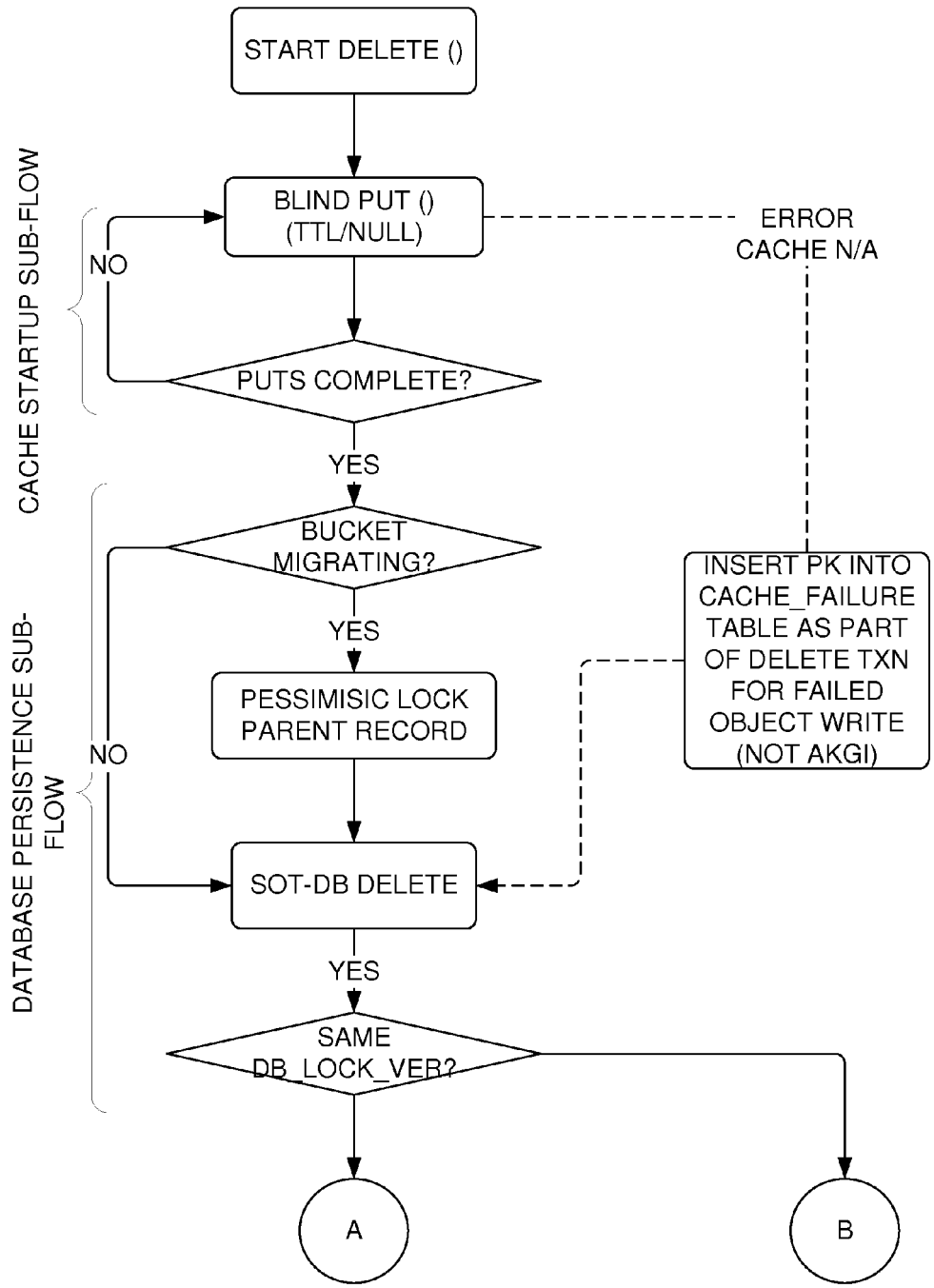
FIGS. 7A and 7B represent a flowchart diagram of an embodiment of a process for performing delete operations across a primary data store, a secondary data store, and an external global index.
Figure 7B:
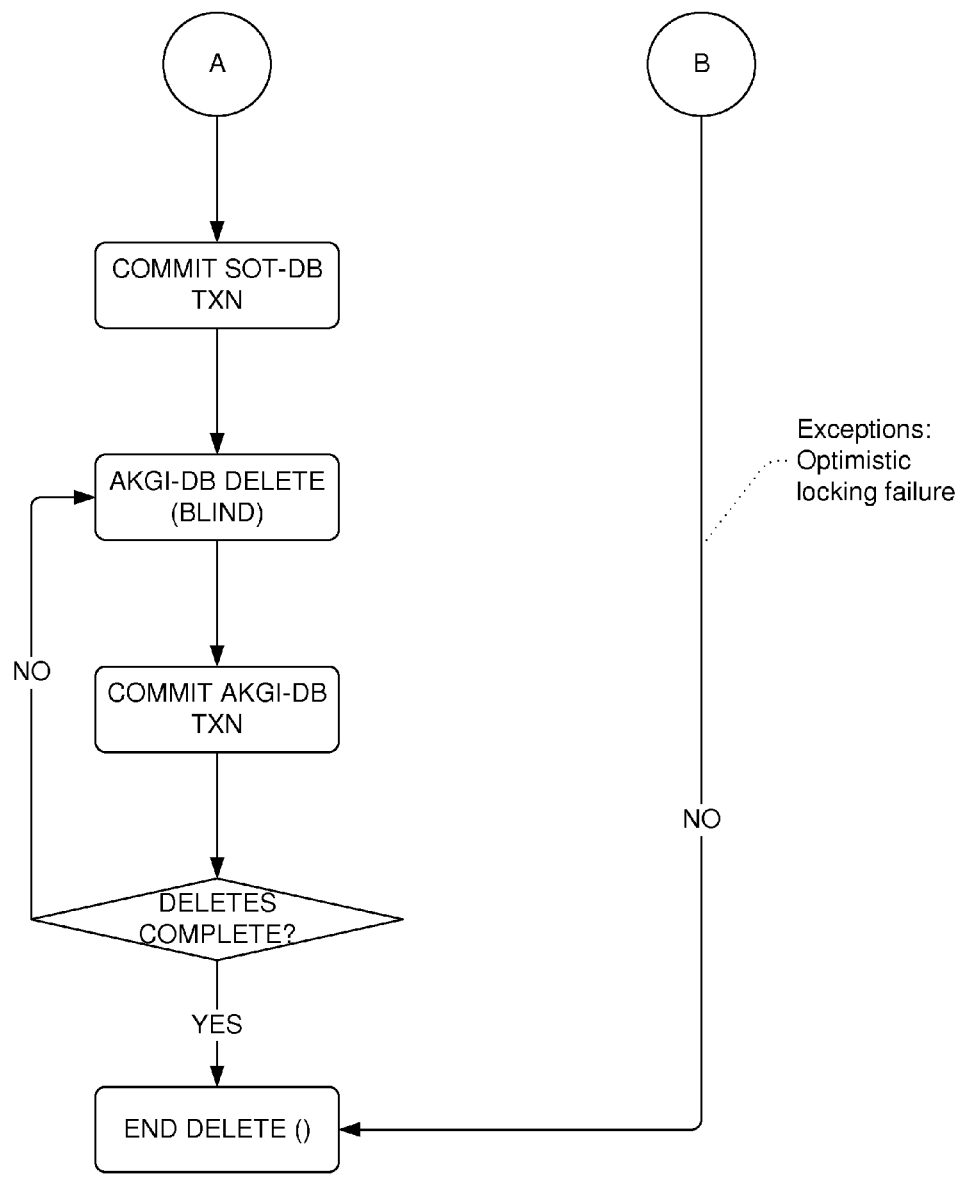

FIGS. 7A and 7B represent a flowchart diagram of an embodiment of a process 700 for cache delete operations.

The flow for deleting data from the primary/secondary data stores is an abbreviated form of the put( ) flow in which the finalization phase is not required. In addition, the delete flow does not depend on a distributed transaction when removing an aggregate from the primary data store and external global index. Because a delete can safely remove an aggregate prior to removing associated AK_HASH-to-PK mappings from the external global index, a distributed transaction is avoided. This design opens the acceptable (and mitigated) risk of orphaned AKs.

The delete flow is optimized to remove data in as few operations as possible while mitigating race conditions that would leave the primary and secondary inconsistent.

During the initialization phase, the application sets the cache lock version and TTL for the aggregate and AK_HASH-to-PK mapping copies in the secondary data store 106. Because there is no finalization phase for delete( ), this change is intended solely to prevent prior active transactions from attempting to repair (repopulate) the secondary data store.

Also during the initialization phase, DAL 104 overwrites aggregate copy's application data with a null payload. Setting a null payload forces subsequent reader sessions to access the primary data store, thus reducing the chance for concurrent readers to "see" the record that is being deleted. Because readers will not attempt to repair a record in the secondary data store that has a null payload, read/repair operations will not inadvertently repopulate deleted secondary store records.

The initialization of the secondary data store is "blind"; there is no optimistic locking check during update using CAS semantics.

As a result of the initialization phase, the records being deleted will expire from the secondary data store within the specified TTL (e.g., 20 seconds). Subsequent reads will bypass the secondary store and will not attempt repair (repair is insert-only). Subsequent puts (updates) may be able to get a pin on the secondary data store. The result of the update/delete race-condition depends upon the order in which the operations reach the primary data store. Specifically, the first operation to successfully update the primary data store will become the source-of-truth and the other operation will (correctly) fail due to an optimistic lock failure. In either situation, the item in the secondary data store will be expired based on the application-specified TTL.

Deletion from the primary data store follows the initialization phase. During this phase, the aggregate in question is deleted using the same optimistic locking protocol defined for the put operation. Supposing the database lock version provided by the application matches the version of the persisted object, the deletion will succeed. Upon successful delete from the primary data store, the data is no longer available in either the primary or secondary.

Upon successful deletion from the primary data store, AK_HASH-to-PK mapping data is deleted from the external global index. The external global index maintenance occurs as a separate transaction. Failure to delete AK_HASH-to-PK mappings may be reconciled through subsequent data access flows.

As referenced previously, there is no secondary data store finalization phase. Upon TTL timeout, the null object will expire and be removed from the secondary data store without need for an additional finalization phase.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   receiving, by a data access logic (DAL) framework comprising one or more processors, a request for a write operation of a record, the DAL framework managing cache persistence associated with a sharded database, a secondary data store, and an alternative key global indexes (AKGI) database, the secondary data store being configured to act as a read cache to offload read activity from the sharded database;
   initializing the secondary data store by (1) updating metadata of the record in the secondary data store, the metadata comprising a primary key (PK) associated with the record, and an alternative key (AK) hash value associated with the record, (2) not changing content data of the record when the record is not a new aggregate, and (3) storing a null payload in the content data of the record when the record is a new aggregate, wherein updating the metadata of the record in the secondary data store comprises:
      setting a transaction-specific time-to-live (TTL) for the record, the transaction-specific TTL being specified by an application that requested the write operation; and
      setting a check-and-set (CAS) value for the record;
   performing, based on the PK and the AK hash value, the write operation of the record in the AKGI database and the sharded database, respectively, in a single coordinated transaction in which a modification of the AKGI database is completed before modifying the sharded database; and
   updating the content data of the record in the secondary data store, in a finalization phase of the secondary data store, by (1) resetting the metadata, including the transaction-specific TTL, and (2) persisting aggregate data and AKGI data to the secondary data store in response to determining that: (i) the write operation is successfully completed and the record is committed to the sharded database and the AKGI database, and (ii) the CAS value has not been changed during the transaction-specific TTL.

2. The method of claim 1, wherein performing the write operation of the record in the AKGI database and the sharded database comprises performing the write operation of the record in the sharded database after the write operation of the record is performed in the AKGI database.

3. The method of claim 1, wherein:
   initializing the secondary data store comprises setting an optimistic locking value associated with the record; and
   performing the write operation of the record in the AKGI database and the sharded database comprises performing the write operation of the record in the AKGI database and the sharded database in response to determining that the optimistic locking value has not been changed.

4. The method of claim 1, further comprising:
   writing the content data of the record in the secondary data store in response to a determination that the secondary data store does not include the record.

5. The method of claim 1, further comprising:
   performing a delete operation of the record in the AKGI database in response to a determination that the write operation of the record in the AKGI database is not successfully completed.

6. The method of claim 1, further comprising:
   modifying the AK hash value associated with the record in response to a determination that the write operation of the record in the AKGI database is not successfully completed.

7. The method of claim 1, further comprising:
   determining that initializing the secondary data store is not successfully completed; and
   logging the record in a cache failure log table comprising the PK associated with the record and a timestamp associated with the record.

8. The method of claim 1, wherein the secondary data store is an external cache that is physically separate from the sharded database.

9. An apparatus comprising:
   a memory configured to store data and one or more sets of instructions; and one or more processors coupled to the memory, the one or more processors configured to execute the one or more sets of instructions and perform operations comprising:

receiving a request for a write operation of a record in a secondary data store associated with a sharded database and an alternative key global indexes (AKGI) database, the secondary data store being configured to act as a read cache to offload read activity from the sharded database;

determining whether the secondary data store includes the record; and in response to a determination that the secondary data store includes the record:

initializing the secondary data store by (1) updating metadata of the record in the secondary data store, the metadata comprising a primary key (PK) associated with the record and an alternative key (AK) hash value associated with the record, (2) not changing content data of the record when the record is not a new aggregate, and (3) storing a null payload in the content data of the record when the record is a new aggregate, wherein updating the metadata of the record in the secondary data store comprises:

setting a transaction-specific time-to-live (TTL) for the record, the transaction-specific TTL being specified by an application that requested the write operation; and setting a check-and-set (CAS) value for the record;

performing, based on the PK and the AK hash value, the write operation of the record in the AKGI database and the sharded database, respectively, in a single coordinated transaction in which a modification of the AKGI database is completed before modifying the sharded database; and updating the content data of the record in the secondary data store, in a finalization phase of the secondary data store, by (1) resetting the metadata, including the transaction-specific TTL, and (2) persisting aggregate data and AKGI data to the secondary data store in response to determining that: (i) the write operation is successfully completed, and (ii) the CAS value has not been changed during the transaction-specific TTL.

10. The apparatus of claim 9, wherein the apparatus comprises a data access layer (DAL) that manages cache persistence associated with the secondary data store and the sharded database.

11. The apparatus of claim 9, wherein performing the write operation of the record in the AKGI database and the sharded database comprises performing the write operation of the record in the sharded database after the write operation of the record is performed in the AKGI database.

12. The apparatus of claim 9, wherein:

initializing the secondary data store comprises setting an optimistic locking value associated with the record; and performing the write operation of the record in the AKGI database and the sharded database comprises performing the write operation of the record in the AKGI database and the sharded database in response to determining that the optimistic locking value has not been changed.

13. The apparatus of claim 9, wherein the operations performed by the one or more processors further comprise:

writing the content data of the record in the secondary data store in response to a determination that the secondary data store does not include the record.

14. The apparatus of claim 9, wherein the operations performed by the one or more processors further comprise:

performing a delete operation of the record in the AKGI database in response to a determination that the write operation of the record in the AKGI database is not successfully completed.

15. The apparatus of claim 9, wherein the operations performed by the one or more processors further comprise:

modifying the AK hash value associated with the record in response to a determination that the write operation of the record in the AKGI database is not successfully completed.

* * * * *